United States Patent [19]

Siegel

[11] Patent Number: 4,967,643
[45] Date of Patent: Nov. 6, 1990

[54] BRAKE BOOSTER

[75] Inventor: Heinz Siegel, Stuttgart, Fed. Rep. of Germany

[73] Assignee: Robert Bosch GmbH, Stuttgart, Fed. Rep. of Germany

[21] Appl. No.: 424,462

[22] Filed: Oct. 20, 1989

[30] Foreign Application Priority Data

Dec. 15, 1988 [DE] Fed. Rep. of Germany ....... 3842224

[51] Int. Cl.⁵ ............................................. F15B 9/10
[52] U.S. Cl. ................................. 91/369.1; 60/545; 60/547.1; 60/593; 60/594
[58] Field of Search ........................ 91/369.1, 369.3; 60/545, 547.1, 593, 594

[56] References Cited

U.S. PATENT DOCUMENTS

| 3,871,497 | 3/1975 | Bessiere | 60/545 |
| 3,877,226 | 4/1975 | Blum | 60/545 |
| 4,208,879 | 6/1980 | Segawa | 60/547.1 |
| 4,494,377 | 1/1985 | Sato | 60/547.1 |
| 4,580,847 | 4/1986 | Burgdorf | 303/100 |
| 4,603,918 | 8/1986 | Lieber et al. | 60/547.1 |
| 4,708,405 | 11/1987 | Belart | 303/114 |
| 4,723,412 | 2/1988 | Buschmann | 60/545 |

FOREIGN PATENT DOCUMENTS 3241662 5/1982 Fed. Rep. of Germany .

Primary Examiner—Ronald C. Capossela
Attorney, Agent, or Firm—Edwin E. Greigg

[57] ABSTRACT

In a brake booster, a master brake cylinder is connected to a brake pedal via a piston rod, which acts upon a master cylinder piston by way of which at least one brake chamber can be put at brake pressure. In this way, servo fluid flows via brake lines to corresponding wheel brake cylinder is a servo chamber, which via a control element communicates with a device for supplying servo fluid to the servo chamber. This control element is controlled via a travel transducer that detects the motion of the piston rod. A lever arrangement is also connected to the piston rod, and on its other end is operatively connected to the travel transducer, which triggers the control element via an electronic unit to maintain the servo pressure.

20 Claims, 1 Drawing Sheet

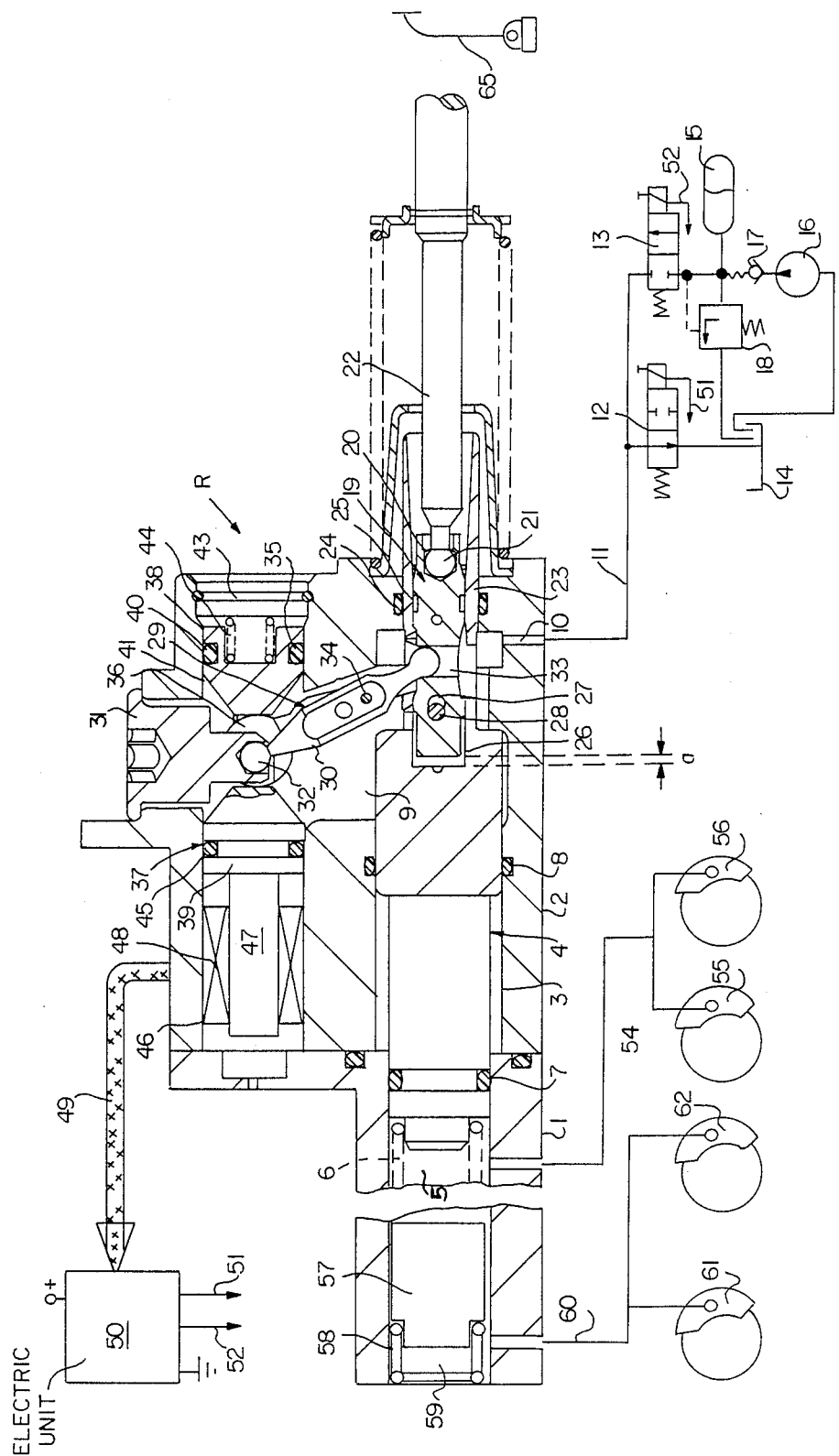

BRAKE BOOSTER

BACKGROUND OF THE INVENTION

The invention relates to a brake booster having a master brake cylinder as defined herein.

A brake booster of this type has been set forth in German patent application No. P38 42 224.7. The present invention is intended to simplify the subject of the previously filed patent application and to embody it kinematically differently.

A brake system of the aforementioned type is also known for example from German Offenlegungsschrift No. 32 41 662, in which an electric travel transducer is provided. Upon each braking, electric cables for the transducer must be moved as well. In the course of time, given the many times braking is performed, this leads to cable breakage, thus threatening operation of the brake system. Furthermore, the master cylinder piston, embodied as a servo piston, must be secured against torsion.

OBJECT AND SUMMARY OF THE INVENTION

A brake booster according to the present invention incorporates a lever arrangement which moves a travel transducer mechanically, so that no cables have to be moved during operation of the brake booster.

Via the travel transducer, an electronic unit is triggered that triggers a control element in response to output signals of the travel transducer. Via the control element, a servo chamber or its supply line is either connected to a servo fluid supply tank, or a servo fluid pressure reservoir or feed pump, or blocked completely.

The control element may for instance be a 3/3-way magnetic valve. However, two 2/2-way magnetic valves are preferable, with one of them in the line between the servo chamber and the supply tank and the other in the line between the pressure reservoir or feed pump and the servo chamber.

In the present exemplary embodiment, inductive transducers are suitable as travel transducers.

According to the invention, a lever arrangement should comprise two levers joined together via a swivel joint. The first lever slidingly engages a recess in the piston rod and on the other end is pivotably connected to the housing. This is preferably done via a ball that rests in a receiving depression of a screw-in part structurally connected to the housing.

The second lever is operatively connected at one end to the master cylinder piston and at the other end to the travel transducer embodied as a piston. If the first lever is displaced by the piston rod, this motion produces a scissorslike motion between the two levers, causing the second lever likewise to move in the direction of motion of the piston rod and to carry the travel transducer with it.

The travel transducer preferably comprises two sub-pistons, with the second lever engaging the area between them. One sub-piston is intended to be supported in a housing bore counter to a helical spring that keeps it, or the entire piston, in a predetermined outset position. The second sub-piston, with a transducer bolt, reaches through a coil package and thus, upon a change in position, effects an outset signal for the aforementioned electronic unit. In this electronic unit, the output signal is processed, and the control element, or in other words preferably the two magnetic valves, are triggered accordingly.

The invention will be better understood and further objects and advantages thereof will become more apparent from the ensuing detailed description of a preferred embodiment take in conjunction with the drawing.

BRIEF DESCRIPTION OF THE DRAWING

The sole FIGURE of the drawing shows a fragmentary longitudinal section through an electro-hydraulic booster, with its control shown as a circuit diagram, of an apparatus for supplying servo fluid.

DESCRIPTION OF THE PREFERRED EMBODIMENT

Of the electrohydraulic booster R, or master brake cylinder, only a small part of a brake pressure chamber housing 1 is shown, with an adjoining housing 2 for the servo control. Sliding in a bore 3 of this housing 2 is a master cylinder piston 4, which at the same time acts as a servo piston. In the brake pressure chamber housing 1, the piston 4 forms a brake chamber 5, in which the piston supports one end of a helical spring 6. The brake chamber 5 is connected by a pressure line 54 which connects with the back wheel brake cylinders 55 and 56. Following the piston 4 is a piston 57 which operates against a return spring 58 in a chamber 59. The chamber 59 is connected by pressure line 60 with the brake cylinders 61 and 62 of the front wheels.

This brake circuit is sealed off by a ring seal 7 surrounding the piston 4. A further ring seal 8 positioned in an annular groove in the bore 3 provides sealing with respect to the piston 4 and a servo chamber 9. This servo chamber 9 communicates via a radial bore 10 in the housing 2 and a line 11 with two separate magnetic valves 12 and 13. The magnetic valve 12 is followed by a supply tank 14 for servo fluid. Contrarily, the magnetic valve 13 is followed by a pressure reservoir 15, which can be filled with servo fluid from the supply tank 14 via a feed pump 16. A one-way check valve 17 prevents the servo fluid from flowing back out of the pressure reservoir 15 into the feed pump 16. For safety's sake, a pressure limiting valve 18 is connected to the output of the feed pump 16 downstream of the one-way valve to which the reservoir 15 is connected.

In the servo chamber 9, a piston rod 19 engages one end of the master cylinder piston 4 toward its face end. Toward the back, the piston rod 19 has a flanged collar 20, which encompasses a ball 21 of a knuckle rod 22. The knuckle rod 22 is operatively connected with a brake pedal, not shown.

The piston rod 19 is guided in a guide sleeve 23, in a bore in the housing 2, and suitable seals 24 and 25 are disposed between the piston rod 19 and the guide sleeve 23, and between the guide sleeve 23 and the housing 2, respectively.

Part of the piston rod 19 slides in a suitable blind bore 26 on the face end of the master cylinder piston 4 and is guided with respect to the master cylinder piston 4 by means of a transverse bolt 28 which penetrates the end of piston 4 and an oblong slot 27 in the piston rod 19.

Also operatively connected to the piston rod 19 is a double lever arrangement 29. A first lever 30 of the lever arrangement 29 is connected at one end via a ball 32 which engages a screw-in part 31 in housing 2. The other end of this lever 30 engages a recess 33 in the piston rod 19, and is capable of sliding freely in this recess 33.

Via a swivel joint 34, a second lever 35, mostly hidden behind lever 30, is supported on the first lever 30, again supported at one end on the piston rod 19; with a head 36 on the other end, connected to a transducer piston of an inductive transducer element 37.

On both sides of the head 36 of the second lever 35, the transducer piston has sub-pistons 38 and 39, with the piston 38 sliding in a stepped bore 41 in the housing 2 and sealed off via a seal 40. This stepped bore 41 is closed off from the outside via a stopper cap 43 firmly positioned via a snap ring 42. The sub-piston 38 is supported against one end of a helical spring 44 with the opposite end of the helical spring supported by the stopper cap 43.

On the other side of the head 36, the sub-piston 39 slides in a longitudinal bore 46 in the housing 2 and is sealed with a seal 45. A transducer bolt 47 extends from sub-piston 39 so that the transducer bolt 47, extends into coil laminations 48 and thus forms an inductive travel transducer. An electric unit 50 is connected to the coil laminations 48 via a feed line 49.

The mode of operation of the electrohydraulic booster R according to the invention is as follows:

Via the brake pedal 65, a brake pressure is exerted on the knuckle rod 22. The knuckle rod 22 transmits this brake pressure onto the piston rod 19, which can execute an idle stroke a the length of which depends on the embodiment of the oblong slot 27. Via the lever assembly 29 and in particular via the second lever 35, the transducer piston is moved leftward, so that the transducer bolt 47 assumes a different position in the coil lamination 48.

This change on the part of the transducer bolt 47 generates a signal via the electrical line to the electronic unit 50, which processes the signal and via the lines 51 and 52 triggers the magnetic valves 12 and 13. The magnetic valve 12 is closed, and the magnetic valve 13 is opened. Servo fluid from the pressure reservoir 15 can now flow via the line 11 into the servo chamber 9, so that the master cylinder piston 4 is likewise adjusted leftward. In this motion the master cylinder piston 4 carries the second lever 35 along as well, so that the transducer piston is returned to its initial position. The resulting signal is fed via the electrical line 49 to the electronic unit 50 which causes the magnetic valve 13 to move into its closing position and causes the pressure to be maintained.

Upon cancellation of the brake pressure resulting from the knuckle rod 22, the magnetic valve 12 is opened, so that the servo fluid can flow out of the servo chamber 9 back into the supply tank 14.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A brake booster having a housing, a master brake cylinder, at least one master cylinder piston operative in said master brake cylinder, a piston rod (19) in said housing that acts on said at least one master cylinder piston, via which at least one brake chamber in said master brake cylinder can be placed at brake pressure, so that brake fluid flows via brake lines to corresponding wheel brake cylinders, a brake pedal connected to said piston rod via a knuckle rod, a servo chamber in said housing which receives fluid that acts upon said at least one master cylinder piston, a fluid supply means connected via a supply line with said servo chamber, at least one control element in said supply line, said control element being controlled via a signal from a travel transducer (37) in said housing, a lever arrangement (29) connected at one end to said piston rod (19) and on its other end is operatively connected to said travel transducer (37), and an electronic unit (50) connected electrically with said travel transducer to produce a signal which controls said at least one control element.

2. A brake booster as defined by claim 1, in which said at least one control element connects said servo chamber (9) with a supply tank (14), pressure reservoir (15) and a feed pump (16) for servo fluid, and can block servo fluid flow to said servo chamber.

3. A brake booster as defined by claim 2, in which said at least one control element comprises a first 2/2-way magnetic valve (12) incorporated into said supply line between the servo chamber (9) and the supply tank (14), and a second 2/2-way valve (13) incorporated into said supply line between the pressure reservoir (15) and said feed pump (16) and the servo chamber (9).

4. A brake booster as defined by claim 3, in which said travel transducer is an inductive transducer.

5. A brake booster as defined by claim 3, in which said lever arrangement (29) comprises a first lever (30) and a second lever (35) joined together via a swivel joint (34).

6. A brake booster as defined by claim 2, in which said travel transducer is an inductive transducer.

7. A brake booster as defined by claim 2, in which said lever arrangement (29) comprises a first lever (30) and a second lever (35) joined together via a swivel joint (34).

8. A brake booster as defined by claim 1, in which said travel transducer is an inductive transducer.

9. A brake booster as defined by claim 8, in which said lever arrangement (29) comprises a first lever (30) and a second lever (35) joined together via a swivel joint (34).

10. A brake booster as defined by claim 1, in which said lever arrangement (29) comprises a first lever (30) and a second lever (35) joined together via a swivel joint (34).

11. A brake booster as defined by claim 10, in which one end of said first lever (30) slidingly engages a recess (33) in said piston rod (19), while its other end rests articulatedly with a ball (32) in a screw-in part (31) structurally connected to said housing.

12. A brake booster as defined by claim 11, in which one end of said second lever (35) is operatively connected with said at least one master cylinder piston (4) and its other end is connected with the travel transducer embodied as a transducer piston.

13. A brake booster as defined by claim 12, in which said transducer piston comprises first and second sub-pistons (38, 39), and said first and second sub-pistons slide in corresponding bores (41, 46) parallel to said at least one master cylinder piston (4).

14. A brake booster as defined by claim 13, in which said first sub-piston (38) is supported via a spring means (44) against a closure cap (43).

15. A brake booster as defined by claim 14, in which said second sub-piston includes a transducer bolt (47) which slidingly penetrates a coil lamination (48) of said travel transducer.

16. A brake booster as defined by claim 10, in which one end of said second lever (35) is operatively connected with said at least one master cylinder piston (4) and its other end is connected with the travel transducer embodied as a transducer piston.

17. A brake booster as defined by claim 16, in which said transducer piston comprises first and second sub-pistons (38, 39), and said first and second sub-pistons slide in corresponding tores (41, 46) parallel to said at least one master cylinder piston (4).

18. A brake booster as defined by claim 17, in which said first sub-piston (38) is supported via a spring means (44) against a closure cap (43).

19. A brake booster as defined by claim 18, in which said second sub-piston includes a transducer bolt (47) which slidingly penetrates a coil lamination (48) of said travel transducer.

20. A brake booster as defined by claim 19, in which said coil lamination is connected via an electrical line (49) with said electronic unit (50) that triggers said at least one control element (12, 13).

* * * * *